US 7,583,695 B2

(12) United States Patent
Vimpari et al.

(10) Patent No.: US 7,583,695 B2
(45) Date of Patent: Sep. 1, 2009

(54) HARDWARE ARRANGEMENT, TERMINAL, AND METHOD FOR TRANSFERRING AUDIO SIGNAL IN PACKET-SWITCHED COMMUNICATIONS NETWORK

(75) Inventors: Markku Vimpari, Oulu (FI); Simo Hyytiä, Espoo (FI); Jari Vallström, Oulu (FI); Pekka Kuure, Espoo (FI); Richard Bontempi, Helsinki (FI)

(73) Assignee: Nokia Corporation, Espoo (FI)

( * ) Notice: Subject to any disclaimer, the term of this patent is extended or adjusted under 35 U.S.C. 154(b) by 980 days.

(21) Appl. No.: 10/150,441

(22) Filed: May 17, 2002

(65) Prior Publication Data

US 2003/0147419 A1  Aug. 7, 2003

(30) Foreign Application Priority Data

Dec. 21, 2001 (FI) .................................. 20012541

(51) Int. Cl.
*H04J 3/16* (2006.01)
(52) U.S. Cl. ........................ 370/466; 370/392
(58) Field of Classification Search .................. None
See application file for complete search history.

(56) References Cited

U.S. PATENT DOCUMENTS 5,579,316 A   11/1996  Venters et al. ............. 370/94.1
6,608,841 B1*  8/2003  Koodli ........................ 370/474
6,680,955 B1*  1/2004  Le ............................... 370/477
6,751,209 B1*  6/2004  Hamiti et al. ............... 370/349
6,754,231 B1*  6/2004  Jonsson et al. ............. 370/474
6,882,637 B1*  4/2005  Le et al. ...................... 370/349
7,002,993 B1*  2/2006  Mohaban et al. ........... 370/471

FOREIGN PATENT DOCUMENTS

EP   1 045 562 A2   10/2000
EP   1 079 643 A1    2/2001
WO   WO 00/49748    8/2000

OTHER PUBLICATIONS

Casner et al., "Compressing IP/UDP/RTP Headers for Low-Speed Serial Links" RFC 2508, Internet Engineering Task Force, Feb. 1999, pp. 1-22.*
"Wireless Real-time IP Services Enabled by Header Compression", Krister Svanbro et al, 2000, pp. 1150-1154.
"Efficient and Robust Header Compression for Real-Time Services", Khiem Le, et al., 2000, pp. 924-928.

* cited by examiner

*Primary Examiner*—Michael J Moore, Jr.
(74) *Attorney, Agent, or Firm*—Perman & Green LLP

(57) ABSTRACT

The invention relates to a protocol converter (14) and a method utilizing the converter, enabling a wireless connection (13) between a cellular network (11) and a terminal to apply a reduced RTP protocol according to the invention, instead of the RFC 1889 protocol, in order to save communications capacity on speech connections.

12 Claims, 2 Drawing Sheets

Figure 1:
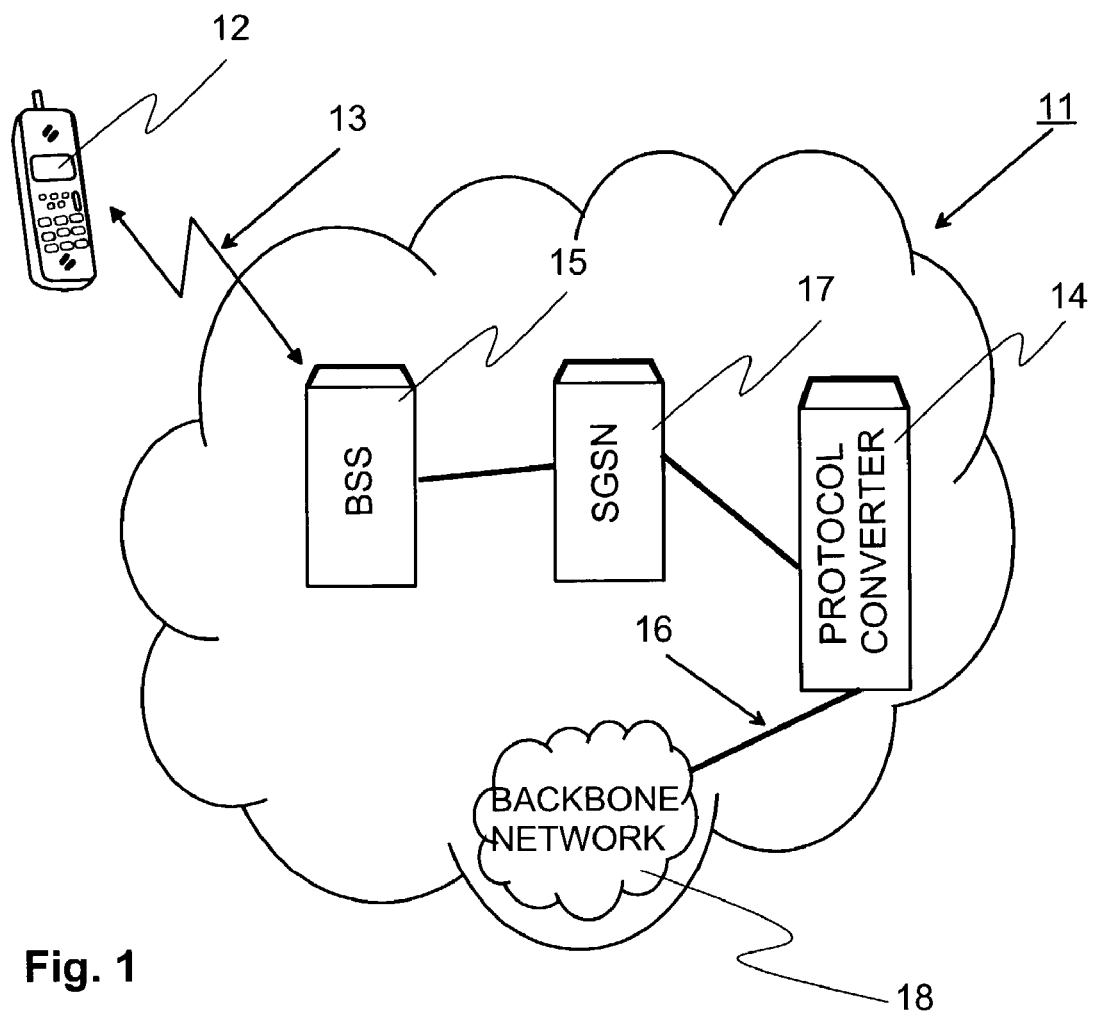

HARDWARE ARRANGEMENT, TERMINAL, AND METHOD FOR TRANSFERRING AUDIO SIGNAL IN PACKET-SWITCHED COMMUNICATIONS NETWORK

The invention relates to a protocol converter to be used in conjunction with a telecommunication network, which protocol converter is arranged so as to carry out a conversion of a header of a received encoded packet containing speech sample blocks, between RTP packet header according to the IETF standard RFC 1889 and a reduced RTP packet header according to the invention. The invention also relates to a software means for implementing the protocol converter. The invention further relates to a cellular network and a method which utilize a protocol converter according to the invention.

As networks are being digitalized, data communications is more and more beginning to rely on packet-switched connections. With the spread of the Internet, packet-switched data communications has become a de facto standard for non-real-time applications. Data communicated on a packet-switched Internet connection are organized in multiple data blocks, or packets, which include 65,535 bytes at the most as well as an address specifying the recipient. At the recipient, the received data packets are reorganized in the correct order for further processing. Especially in non-real-time applications, including various data connections between computers, this technology involves considerable benefits in the utilization of communications networks as network capacity is used only when there is data to be transferred. Each packet has a header to guide it to the correct destination. In a fixed communications network there is on average enough communications capacity, so the size of the header is no problem. Thus the IPv4 Internet Protocol, which is currently widely used within the Internet, uses a 20-byte header, and the forthcoming IPv6 uses a 40-byte header.

Real-time audio and video connections, which, until now, have mostly relied on circuit-switched technology, are also beginning to transform into packet-switched Internet-type connections. Methods for the so-called VoIP (Voice over IP) are being currently developed and standardized. The nature of VoIP, however, imposes new requirements on the transfer of packets from a sender to a recipient, because the packets have to be at the disposal of the recipient at certain precise moments of time in the correct order and delayed by a certain maximum delay at the most, usually less than 150 ms. In this case the IP protocols used in the conventional packet-switched communications are heavy to use. Large headers in each packet transferred slow down packet processing and eat up transfer capacity.

Real-time packet-switched connections thus require more effective transfer methods, which can make data communications more efficient in real-time applications. A compression method called Robust Header Compression (ROHC) is being developed under the Internet Engineering Task Force (IETF). In the ROHC method, only the header information that was changed from the previous packet is added to the packet transferred. However, the defining of the ROHC is still under way and apparently will take several years to complete and, moreover, its application to wireless connections is problematic, since it has a limited error recovery capability.

It is also known a method for enhancing data communications, in which method the header is at least partly removed. This method is proposed to be used for radio-based connections in a third-generation cellular network defined in the 3$^{rd}$ Generation Partnership Program (3GPP). Use of the method, however, requires that a separate radio path is allocated for a connection employing this method and, therefore, it rather resembles a conventional circuit-switched connection.

Real-time packet-switched data transfer is based on the IETF standard RFC 1889 that defines the Real Time Protocol (RTP) to be used in real-time data communications. Packets belonging to an audio or video stream must be organized in the correct order at the receiving end, and that is just what the RTP is used for. If a packet was lost on the way, the received packets can, however, be played out at the right moment. For example, a lost speech packet is masked by a speech codec, i.e. in practice the last sound is extended at a damped level. The header of a standard RTP packet is shown in Table 1.

TABLE 1

RTP protocol header

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|X|  CC   |M|     PT      |       Sequence Number        |
+-+-+-+-+-+-+-+-+-+-+-+-+-+-+-+-+-+-+-+-+-+-+-+-+-+-+-+-+-+-+-+-+
|                           Timestamp                            |
+-+-+-+-+-+-+-+-+-+-+-+-+-+-+-+-+-+-+-+-+-+-+-+-+-+-+-+-+-+-+-+-+
|              Synchronization Source (SSRC) Identifier          |
+-+-+-+-+-+-+-+-+-+-+-+-+-+-+-+-+-+-+-+-+-+-+-+-+-+-+-+-+-+-+-+-+
|              Optical contributing source (CSRC) identifiers    |
|                             ....                               |
```

As can be seen from Table 1, a standard RTP protocol header is at least 12 bytes long per data packet transferred. The RTP is advantageous especially when transferring video in a fixed network. Transmission according to the RTP to a receiver need not always occur at regular intervals, which can be utilized in video transfer where the amount of data transferred may vary a lot from one moment to another.

Packet-switched communications based on the IP is making its way into wireless communication systems as well. In these systems the radio path limits the transmission band available to each transmission link so that it is clearly narrower than that available to conventional wired connections. The 12-byte header required by the RTP almost corresponds to the size of a 20-ms sound sample block generated by one adaptive multirate (AMR) speech codec, which at the lowest bit rate of AMR is 13 bytes. As the RTP, too, thus reserves a considerable portion of the transmission capacity available, it cannot be efficiently used as such in the wireless transfer of audio signals.

Development work is being done; based on the VoIP, with the aim of applying the VoIP to half-duplex group call technology, too. In such an application it is not possible to apply the ROHC method or the removal of the RTP header because the delay caused by the reservation of a separate radio channel is unacceptable to the application in use.

An object of this invention is to provide a novel protocol converter solution to be used in a packet-switched cellular network to convert an RTP protocol header into a reduced RTP version to be used in a wireless communications network.

The objects of the invention are achieved by a converter arrangement that converts the header of a real-time RTP packet traveling in a packet-switched manner to a telecommunication network terminal into a reduced RTP header according to the invention. Reduced RTP headers coming from a terminal are converted by a converter according to the invention into headers according to the conventional RTP protocol for communication in a backbone network proper.

A protocol converter according to the invention is characterized in that the protocol converter is arranged so as to process the header of a reduced RTP packet in two or four bytes so that a packet containing an audio signal sample can be transferred in a communications network in a manner that saves communications capacity.

Software means according to the invention are characterized in that they comprise means for implementing an RTP protocol converter operating in real time.

A telecommunication network according to the invention is characterized in that it comprises a protocol converter for processing the header of an RTP packet according to the IETF standard RFC 1889 as a header according to a reduced RTP protocol, containing four bytes at the most, so that a packet containing an audio signal sample can be transferred on a wireless connection between a terminal and a base station subsystem saving communications capacity.

A method according to the invention is characterized in that the communication between a protocol converter and terminal utilizes a reduced RTP protocol, the headers of packets according to the reduced RTP protocol comprising an F field one bit long,
an M field one bit long,
an R field one bit long,
a C field one bit long,
an S field one bit long,
a PT field three bits long,
an SN field eight bits long, and
a CS field 16 bits long.

Advantageous embodiments of the invention are specified in the dependent claims.

The basic idea of the invention is as follows: A protocol converter is connected to a wireless packet-switched cellular network or capacity-limited wired network, which protocol converter converts the headers of data packets, carrying audio signal and targeted to a capacity-limited transmission path, into reduced RTP headers according to the invention. A telecommunication network terminal can use the received packets in audio signal reproduction because the header and timing data needed by the terminal are either transferred to the terminal or they can be reconstructed from the RTP packet according to the invention. Correspondingly, the terminal sends only reduced RTP packets according to the invention, which the protocol converter recognizes and converts into standard RTP packet headers for transmission through the backbone network.

An advantage of the invention is that the protocol header in real-time audio signal transfer in a packet-switched, wireless or capacity-limited telecommunication network can be considerably reduced down to 2-4 bytes, whereas in the RTP protocol according to the prior art the header comprises at least 12 bytes. Thus, using the protocol according to the invention, data communication on the radio path is significantly more efficient than in the prior art.

Another advantage of the invention is that it is still possible to use the conventional RTP protocol and the hardware associated therewith in the backbone network, and the protocol conversion need only be carried out at the radio interface when transiting to the wireless communications link.

The invention is below described in detail. The description refers to the accompanying drawings in which FIG. 1 shows, by way of example, a protocol converter according to the invention in a cellular network, and FIG. 2 shows, by way of example, in the form of a flow diagram the stages of a conversion process according to the invention when converting an incoming packet to another protocol format in accordance with the invention.

Figure 2:
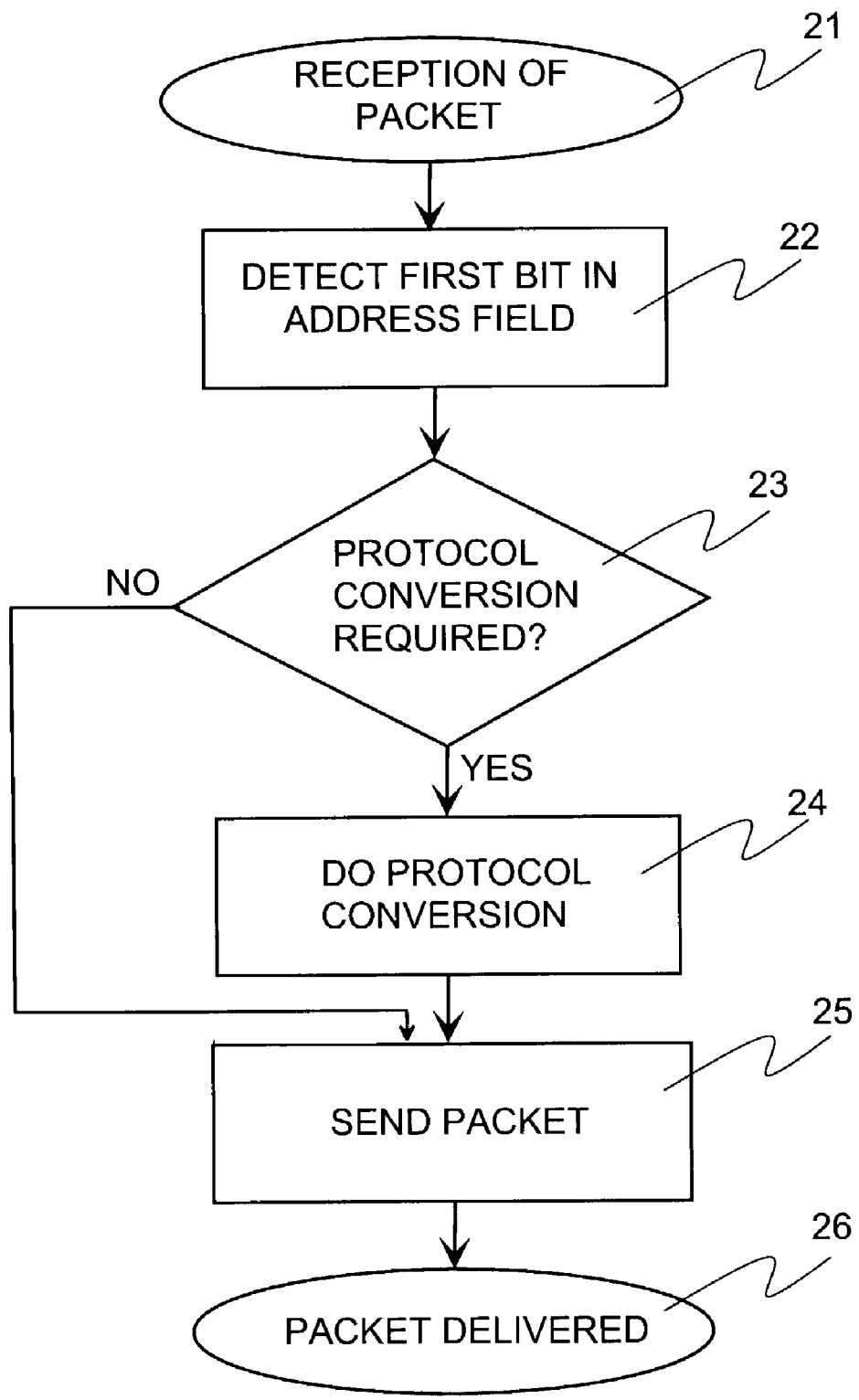

FIG. 1 depicts, as an example, an advantageous application of a protocol converter 14 according to the invention and reduced RTP protocol utilized by means of that converter. The reduced RTP protocol according to the invention is advantageously used in wireless sections of a communications network. In a backbone network 18, however, where transfer capacity is available, a standard RTP protocol is used. A standard RTP protocol means here and hereinafter a protocol according to the IETF standard RFC 1889.

Reference designator 11 in FIG. 1 denotes a digital cellular network where at least part of the data communication is carried out on a packet-switched basis. Such a network is e.g. a General Packet Radio Service (GPRS) network. Within the backbone network, denoted by reference designator 18, the standard RTP protocol is used in conjunction with real-time applications. The backbone network 18 may also be a communications network independent of the cellular network. One part of the cellular network is a so-called operating node 17, or Serving GPRS Support Node (SGSN), through which the packets coming from the backbone network are directed to a certain base station subsystem (BSS) 15. A protocol converter 14 according to the invention is connected between the backbone network 18 and operating node 17. The packets are transferred from the backbone network 18 up to the protocol converter 14 using the standard RTP protocol, reference designator 16.

The protocol converter 14 can convert the standard RTP protocol into a reduced RTP protocol according to the invention to be transferred to a wireless communications connection 13. A cellular network terminal 12 is able to use the reduced RTP protocol according to the invention both in its transmission and reception functions.

To be able to use the reduced RTP protocol according to the invention in the transmission and reception of speech sample packets a terminal 12 includes software means to recognize the protocol used and to use either one of the RTP protocols.

When the terminal 12 sends out a packet using the reduced RTP protocol according to the invention, the protocol converter 14 recognizes from the header of the packet that the packet is in accordance with the reduced RTP. The converter 14 carries out a protocol conversion on the packet received and sends the packet further to the backbone network 18 as a standard RTP packet. Thus no changes are needed in the backbone network 18 because of the invention but prior-art methods and protocols can still be used despite the fact the wireless link utilizes the RTP protocol according to the invention which differs from the standard and utilizes the link more efficiently.

Correspondingly, when receiving an RTP packet from the backbone network 18, which is to be directed to a terminal 12 of a cellular network 11, the protocol converter 14 uses the first bit of the RTP packet to identify the version of the protocol. If necessary, the protocol converter makes the conversion to the reduced version.

The header of the reduced RTP protocol according to the invention is described in Table 2.

TABLE 2

Reduced RTP protocol header according to the invention

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|M|R|C|S|   PT  |   Sequence no |        Checksum (optional)  |
+-+-+-+-+-+-+-+-+-+-+-+-+-+-+-+-+-+-+-+-+-+-+-+-+-+-+-+-+-+-+-+-+
```

The size of the header of the reduced RTP protocol according to the invention is 4 bytes at the most. The header advantageously comprises the following fields. The first field in the header, identification field "F", comprises one bit. In the reduced RTP protocol according to the invention the identification field F is always "0".

This distinguishes the reduced RTP protocol from the standard RTP protocol which has a two-bit version identification field V in the beginning, the first bit of which is always "1".

Thus, on the basis of the first bit in the packet the protocol converter 14 according to the invention knows whether it is receiving a reduced RTP packet according to the invention or a standard RTP packet.

The next field in the protocol according to the invention, marker field M, also comprises one bit. The only difference from the standard RTP protocol is its position in the header.

The next field R comprises one bit and it is reserved for future use. Preferably it could be used same way as a padding bit in RFC 1889. If it is set, the packet contains one or more additional padding octets at the end which are not part of the payload.

The check field C comprises one bit. If it is "1", then the reduced RTP header according to the invention includes an optional, separate checksum field.

The next field S is used to indicate whether the so-called synchronization source (SSRC) has changed. The value of the S field changes always when the synchronization source changes.

The bits in the next, three-bit field PT can represent eight different packet content types (payload types).

The next field SN (Sequence Number) comprises eight bits. It is used to indicate the ordinal number of the packet. Always when the value of the bit in the S field changes, the value of the SN field is reset. After the reset, each packet sent will increment the value of the SN field by one. By means of the SN field the receiver is able to organize the received packets in the correct order. It can also be used to detect a packet loss. If discontinuous transmission (DTX) is applied on the link, meaning that silent portions will not be transmitted at all, the value of the SN field in the receiving end will be incremented by one always when 20 ms have gone from the previous packet received (in GSM-based systems). This delay may be something else as well, depending on the characteristics of the system used. This way, also the sound samples that were sent using DTX can be reproduced with correct timing.

The value of the SN field in the reduced RTP version is obtained by taking the 8 least significant bits from the corresponding 16-bit SN block of the standard RTP format. Conversion in the other direction takes place in such a manner that the upper byte, the eight most significant bits, is a random number which is generated separately for each speech section (or data stream) and which is incremented by one when the lower byte, the eight least significant bits, rolls over, 255->0.

The checksum field CS is optional and it is used if, for some reason, the LLC/UDP checksums (Logical Link Control, User Datagram Protocol) are not used. If it is found out, when calculating the checksum, that the value of the CS field differs from the value calculated, it follows that the contents of the packet in question are rejected. Advantageously the value may also be calculated for part of a packet.

The fields of the reduced RTP header described above are exemplary only, so any one of them can be left out or changed in terms of its length without affecting the inventional idea.

Table 3 shows the protocol conversions (header conversions) carried out by the converter according to the invention from the reduced version to the standard version and vice versa. The first bit in the header is essential to the invention. In the reduced RTP according to the invention it is always "0" (field F, one bit, value "0"), and in the standard RTP it is always "1" (field V, two bits, value "10"). Using the first bit in a packet, the converter 14 according to the invention is able to recognize the RTP used. When the converter 14 additionally knows whether the packet is targeted to a wireless network 13 or a wired one 18, it can automatically carry out the conversions presented in Table 3 on the packets received.

TABLE 3

Conversion table for converter according to the invention

| reduced | Field standard | from reduced to standard | from standard to reduced |
|---|---|---|---|
| N/A | version (V) | create constant value (10) | not applicable, ignore |
| N/A | padding (P) | create constant value (0) | not applicable, ignore |
| N/A | extension (X) | create constant value (0) | not applicable, ignore |
| N/A | CSRC counter (CC) | create constant value (00) | not applicable, ignore |
| M | marker (M) | transfer as such | transfer as such |
| PT | payload type (PT) | received PT is replaced by bits obtained from OR operation on 3 bits of reduced version and bit pattern 1101000 | if 4 MSBs are 1101, then 3 LSBs are transferred as such, otherwise packet is rejected |
| SN | sequence number (SN) | 8 LSBs are transferred as such; if S bit changed, then all bits in MSB octet are zeros | 8 LSBs transferred as such, MSB octet ignored |
| N/A | timestamp | computed from sequence number | not applicable, ignore |
| S | SSRC | if value of S bit from the same source (IP address) has changed, then SSRC value is computed from source's IP address and UDP target port number, otherwise previous SSRC is sent | if current SSRC and previous SSRC are different (sent to the same destination), then the value of S bit is changed |
| N/A | CSRC list | none | not applicable |
| indicat. (F) | N/A | not applicable, ignore | create constant value (0) |
| reserved (R) | N/A | not applicable, ignore | set value to 1 if padding octets in the packet |
| check-sum indicat. (C) | N/A | not applicable | generated in conjunction with checksum calculation |
| check-sum (CS) | N/A | not applicable (if checksum error, RTP packet rejected) | generated with checksum algorithm |

The first one of the columns in Table 3 lists the names of the fields in the header according to the reduced RTP protocol, the second column lists the names of the fields according to the standard RTP, the third column specifies the operations in the conversion from the reduced RTP protocol to the standard RTP protocol, and the fourth column specifies the operations in the conversion from the standard RTP protocol to the reduced RTP protocol. N/A in the first or second column means that the field in question is not applicable to that protocol or it does not exist in one of the protocols.

To carry out protocol conversions the protocol converter 14 according to the invention includes software means that realize the protocol conversion.

FIG. 2 shows, by way of example, a flow diagram of the main stages of the operation of a protocol converter 14 according to the invention. By using a protocol converter 14 according to the invention, as illustrated in FIG. 1, it is possible to utilize a reduced RTP protocol on a wireless connection 13. The protocol converter 14 is located near the radio interface in the network, either as a discrete device or as part of a functional unit of a cellular or backbone network. The converter 14 according to the invention is advantageously used for speech connections with a mobile terminal 12 when the communications connection is packet-switched. In packet-switched transmission of pictures or video to the same terminal 12 it may be advantageous to use the standard RTP protocol. Thus it is possible to receive packets from the wireless connection 13 using either one of said protocols. From the backbone network 18, however, the protocol converter 14 receives only standard RTP packets. The protocol conversion is advantageously realized outside the cellular network 11. The first GRPS or 3G-network entity that can do the conversion is an operating node 17 of the cellular network.

In step 21 of the flow diagram in FIG. 2 a packet is received at a base station subsystem 15 which packet is directed via an operating node 17 to a protocol converter 14. Thus the protocol converter can receive packets either from the direction of the backbone network 18 or from the cellular network 11. In step 22 the first bit in the header of the packet received is tested. If it returns a "0" as the value of the bit, the packet received is a packet according to the reduced RTP. If the value of the bit is "1", then the packet received is a packet according to the standard RTP.

In step 23 it is decided whether a protocol conversion is required or not. A protocol conversion is needed if a packet according to the reduced RTP was received from the radio path 13, which packet has to be transferred via the backbone network 18 to the recipient. Likewise, a conversion is required if a standard RTP packet from the backbone network 18 includes a speech block which has to be transferred via the radio path to a terminal 12 using the reduced RTP in order to save communication capacity. In step 24 the protocol conversion according to the invention is carried out in either direction.

A protocol conversion is not necessarily required if a standard RTP packet is received from the backbone network 18, which packet does not include data that would require real-time processing and which has to be transferred via the radio path 13 to a mobile terminal 12.

In step 25 the packet is sent forward either to the radio path 13 or to the backbone network 18 in a format according to the protocol decided in step 23. The process ends at step 26 in which the packet that was received in step 21 is either delivered to the terminal 12 of the cellular network 11 or transmitted to the backbone network 18 to be sent further.

In one embodiment, an application program is provided in a functional unit of a real-time, packet-switched communications network. The application program can include software code for implementing a real-time RTP protocol converter in accordance with the disclosed embodiments.

In one embodiment, a computer program on a storage or transfer medium is provided for loading an application program to memory for implementing a real-time RTP protocol converter in accordance with the disclosed embodiments.

A few embodiments according to the invention were described above. The invention is not limited to the explanatory solutions described above. For example, the protocol converter according to the invention may also be part of some other structure of the backbone network than that shown in FIG. 1. For instance, it may be part of an SGSN node or part of a server operating in the backbone network. Likewise, the communications connection comprising limited transfer capacity may be other than a wireless link, e.g. a link realized with modems in a telephone network. The inventional idea can be applied in numerous ways within the scope defined by the claims attached hereto.

What is claimed is:

1. A system comprising:
 a packet-switched telecommunication network comprising:
 fixed communications connections, operating nodes, base station subsystems, and wireless terminals, and a backbone network; and
 a protocol converter coupled between the operating nodes and the backbone network, the protocol converter configured to process a header of an RTP packet according to the IETF standard RFC 1889 as a header according to a reduced RTP protocol, containing four bytes at the most, so that a packet containing an audio signal sample is transferred on a wireless connection between a wireless terminal and a base station subsystem by utilizing the reduced RTP protocol for saving communications capacity, wherein the protocol converter is configured to:
 carry out conversion from reduced RTP protocol to standard RTP protocol;
 carry out conversion from standard RTP protocol to reduced RTP protocol; and
 where the header of a reduced RTP packet comprises the following fields:
 an Identification (F) field one bit long indicating if the packet includes a header of the reduced RTP protocol;
 a Marker (M) field one bit long according to RTP protocol;
 a Reserved (R) field one bit long;
 a Check (C) field one bit long indicating if a checksum field is included in the reduced RTP header;
 a Synchronization (S) field one bit long indicating if a synchronization source has been changed;
 a Payload Type (PT) field three bits long indicating a payload type; and
 a Sequence Number (SN) field eight bits long indicating an ordinal number of the RTP packet.

2. The system according to claim 1 wherein the protocol converter is part of an operating node.

3. The system according to claim 1 wherein the reduced RTP packet header further comprises a Checksum (CS) field sixteen bits long.

4. A method comprising:
 using a real-time packet-switched connection between a wireless terminal of a telecommunication network and a base station subsystem of the telecommunication network, where packets are transferred in a backbone network in RTP packets according to the IETF standard RFC 1889, and where the communication between a protocol converter, which connects the backbone network to an operating node in the telecommunication network, and the wireless terminal utilizes a reduced RTP protocol for saving communications capacity;
 detecting receipt of a packet in the protocol converter;
 determining whether the packet is targeted to a wireless network or a wired network; and
 automatically carrying out a conversion of the packet from the reduced RTP protocol to the standard RTP protocol or from the standard RTP protocol to the reduced RTP protocol; wherein the reduced RTP protocol headers comprise the following fields:
 an Identification (F) field one bit long indicating if the packet includes a header of the reduced RTP protocol;
 a Marker (M) field one bit long according to RTP protocol;
 a Reserved (R) field one bit long;
 a Check (C) field one bit long indicating if a checksum field is included in the reduced RTP header;

a Synchronization (S) field one bit long indicating if a synchronization source has been changed;

a Payload Type (PT) field three bits long indicating a payload type; and a Sequence Number (SN) field eight bits long indicating an ordinal number of the RTP packet.

5. A method according to claim 4 wherein the protocol converter is configured to recognize on the basis of the bit in the F field in the packet received whether the packet received is a standard RTP packet or a reduced RTP packet.

6. A method according to claim 5 when the RTP protocol has been identified, a test is carried out in the converter to determine whether a protocol conversion is needed.

7. A method according to claim 6 wherein one of the following protocol conversions is carried out in the protocol converter: conversion from reduced RTP protocol to standard RTP protocol, conversion from standard RTP protocol to reduced RTP protocol.

8. A method according to claim 4 wherein a packet according to the reduced RTP protocol received from a terminal by the protocol converter is converted into an RFC 1889 standard packet prior to being sent from the protocol converter to the backbone network.

9. A method according to claim 4 wherein an RTP packet according to the RFC 1889 standard received from the backbone network by the protocol converter is converted into a packet according to the reduced RTP protocol prior to being sent from the protocol converter via a wireless connection to a terminal.

10. A method according to claim 4 wherein the telecommunication network is a cellular telephone network.

11. The method of claim 4 further comprising recognizing that a packet received from the backbone network to be directed to the terminal is configured according to the standard RTP protocol, and converting the packet to the reduced RTP protocol prior to transmitting the packet to the terminal.

12. The method of claim 4 further comprising recognizing, from a header of a packet received from a terminal, whether the packet is configured according to a standard RTP protocol or the reduced RTP protocol, and wherein, if the packet received from the terminal is configured according to the reduced RTP, converting the packet to the standard RTP protocol prior to transmitting the packet to the backbone network.

* * * * *